US012381900B2

(12) United States Patent
Dong

(10) Patent No.: US 12,381,900 B2
(45) Date of Patent: Aug. 5, 2025

(54) BUILDING A TIME DIMENSION BASED ON A TIME DATA MODEL AND CREATING AN ASSOCIATION RELATIONSHIP BETWEEN THE TIME DIMENSION AND A SECOND DATA MODEL FOR ANALYZING DATA IN THE TIME DIMENSION

(71) Applicant: International Business Machines Corporation, Armonk, NY (US)

(72) Inventor: Na Dong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 18/094,248

(22) Filed: Jan. 6, 2023

(65) Prior Publication Data
US 2024/0236127 A1 Jul. 11, 2024

(51) Int. Cl.
*H04L 9/40* (2022.01)
*G06F 16/28* (2019.01)

(52) U.S. Cl.
CPC ........ *H04L 63/1425* (2013.01); *G06F 16/288* (2019.01)

(58) Field of Classification Search
CPC . H04L 63/1425; H04L 63/1433; H04L 41/14; H04L 41/12; G06F 16/288; G06F 21/577; G06F 16/9024
See application file for complete search history.

(56) References Cited

U.S. PATENT DOCUMENTS

| 8,468,153 | B2 | 6/2013 | Truvé et al. |
| 9,516,052 | B1 | 12/2016 | Chauhan et al. |
| 10,157,195 | B1 * | 12/2018 | Panwar ................. G06F 16/25 |
| 10,205,735 | B2 | 2/2019 | Apostolopoulos |
| 10,467,261 | B1 * | 11/2019 | Doyle .................. G06F 16/248 |
| 11,792,215 | B1 * | 10/2023 | Atay ...................... H04L 67/55 |
| | | | 726/23 |

(Continued)

OTHER PUBLICATIONS

Choi et al., "Deep Learning for Anomaly Detection in Time-Series Data: Review, Analysis, and Guidelines," IEEE Access Year: 2021 | vol. 9 | Journal Article | Publisher: IEEE.*

(Continued)

*Primary Examiner* — Roderick Tolentino
(74) *Attorney, Agent, or Firm* — Zilka-Kotab, P.C.

(57) ABSTRACT

A computer-implemented method according to one approach includes defining a time data model and building a time dimension based on the time data model. The method further includes defining a second data model. An association relationship is created between the time dimension and the second data model for thereafter analyzing data of the second data model in the time dimension. A computer program product according to another approach includes a computer readable storage medium having program instructions embodied therewith. The program instructions are readable and/or executable by a computer to cause the computer to perform the foregoing method. A system according to another approach includes a processor, and logic integrated with the processor, executable by the processor, or integrated with and executable by the processor. The logic is configured to perform the foregoing method.

25 Claims, 9 Drawing Sheets

(56) References Cited

U.S. PATENT DOCUMENTS

| | | | | |
|---|---|---|---|---|
| 2016/0063424 | A1* | 3/2016 | Zeng | H04L 43/0888 |
| | | | | 705/7.39 |
| 2017/0237752 | A1* | 8/2017 | Ganguly | H04L 63/1416 |
| | | | | 726/25 |
| 2017/0300540 | A1 | 10/2017 | Karpistsenko et al. | |
| 2019/0026697 | A1* | 1/2019 | Burton | G06F 8/71 |
| 2019/0095618 | A1 | 3/2019 | Lim | |
| 2020/0322361 | A1 | 10/2020 | Ravindra et al. | |
| 2021/0360013 | A1* | 11/2021 | Huang | H04L 63/1483 |
| 2022/0382878 | A1* | 12/2022 | Maity | G06F 16/245 |
| 2023/0029794 | A1* | 2/2023 | Huang | G06N 3/084 |
| 2023/0308458 | A1* | 9/2023 | Varsanyi | H04L 63/166 |

OTHER PUBLICATIONS

Pintilie et al., "Time Series Anomaly Detection using Diffusion-based Models," 2023 IEEE International Conference on Data Mining Workshops (ICDMW) Year: 2023 | Conference Paper | Publisher: IEEE.*

Mondal et al. "Towards Formal Security Analysis of GTRBAC using Timed Automata," The ACM Symposium on Access Control Models and Technologies (SACMAT), Academia, Jun. 2009, pp. 33-42.

Hesse et al., "Towards a Model for the Integration of Time into a Graph-based Key Performance Indicator Analysis," Proceedings of SIGRAD 2014, Visual Computing, Jun. 2014, pp. 17-23.

Debrouvier et al., "A Model and Query Language for Temporal Graph Databases," The VLDB Journal—The International Journal on Very Large Data Bases, Peer-reviewed author version, Sep. 2021, 35 pages.

Hofer et al., "On Applying Graph Database Time Models for Security Log Analysis," Proceedings of the Future Data and Security Engineering: 7th International Conference, Nov. 2020, 21 pages, retrieved from https://www.researchgate.net/publication/346612247.

Staffan Truve, "10 Years of Building the Security Intelligence Graph: A Tech Retrospective", Apr. 28, 2020, 13 pages, https://www.recordedfuture.com/security-intelligence-graph-retrospective.

* cited by examiner

BUILDING A TIME DIMENSION BASED ON A TIME DATA MODEL AND CREATING AN ASSOCIATION RELATIONSHIP BETWEEN THE TIME DIMENSION AND A SECOND DATA MODEL FOR ANALYZING DATA IN THE TIME DIMENSION

BACKGROUND

The present invention relates to data relationships, and more specifically, this invention relates to building a time dimension based on a time data model and creating an association relationship between the time dimension and a second data model for thereafter analyzing data in the time dimension.

Cyber threats commonly gain unauthorized access to and exploit computer systems of a communication environment, e.g., servers, computers, data storage libraries, etc. These cyber threats may include, e.g., viruses, malware, phishing attacks, web crawlers, etc. Subsequent to gaining unauthorized access to a computer system during a cyber-attack, a cyber threat may exploit the computer system by compromising an integrity of user and/or business data accessed during the cyber-attack, causing a failure of the computer system, compromising programs run by the computer system, etc.

Cyber threat analysis is typically performed to determine a cause of and/or to recover from a cyber-attack. Cyber threat analysis is based on information gathered from multiple security tools which protect, scan, monitor and collect information. The information from the different security tools can establish relationships between different entities, e.g., entities involved in a cyber-attack in order to determine an extent of the cyber-attack within a computer system.

Time, in most cases, is a generally common property that exists in different information from security tools. This information is used to leverage time to link the event, vulnerabilities, errors etc., to analyze a relationship across different kinds of security related information. In this way, the relationship to different data types is built to analyze and describe a cyber threat. However, currently, in order to analyze data in a time dimension, data is queried via time parameters from different data sources, and the results of the queries are merged. Furthermore, this analysis is implemented by using relatively complex data warehouse technology to build a multidimensional analysis data cube, the use of which involves an analysis dimension. A performance of correlation analysis using these conventional techniques is relatively very low, because the analysis includes scanning all data through asynchronous batch processing. At the same time, the model is not updatable on demand with a change of a business in order to meet new requirements that result from the changes to the business. Accordingly, there is a need for techniques to comprehensively analyze all kinds of data with respect to time as a unified analysis dimension.

SUMMARY

A computer-implemented method according to one approach includes defining a time data model and building a time dimension based on the time data model. The time data model is useful for defining specific attributes of the time dimension. The time dimension is built in order to establish a dimension in which operations and/or data is time driven rather than being event driven. The method further includes defining a second data model and creating an association relationship between the time dimension and the second data model for thereafter analyzing data of the second data model in the time dimension. By defining data and/or operations according to the time dimension rather than such data being event driven, processing, that would otherwise be performed to merge results of query operations, is preserved.

The time data model is defined by a plurality of time attributes. The time attributes include a unique identifier of time data, a time type, and a text format. Defining the time model by the time attributes ensures that queries may thereafter be performed according to the built time dimension.

Building the time dimension further includes establishing a relationship between time data defined by the time data model. The relationship is based on a next time relationship that represents a sequential relationship between time data of a same type. Establishing relationships between time data defined by the time data model enables predetermined events to be analyzed with respect to different time data nodes of the time dimension. For example, using the established relationships, analysis of a cyber-threat event may be performed with respect to a plurality of related time data nodes. A fix may be developed based on this analysis in order to enable recovery from such an event.

A computer program product according to another approach includes a computer readable storage medium having program instructions embodied therewith. The program instructions are readable and/or executable by a computer to cause the computer to perform the foregoing method.

A system according to another approach includes a processor, and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

DETAILED DESCRIPTION

Figure 1:
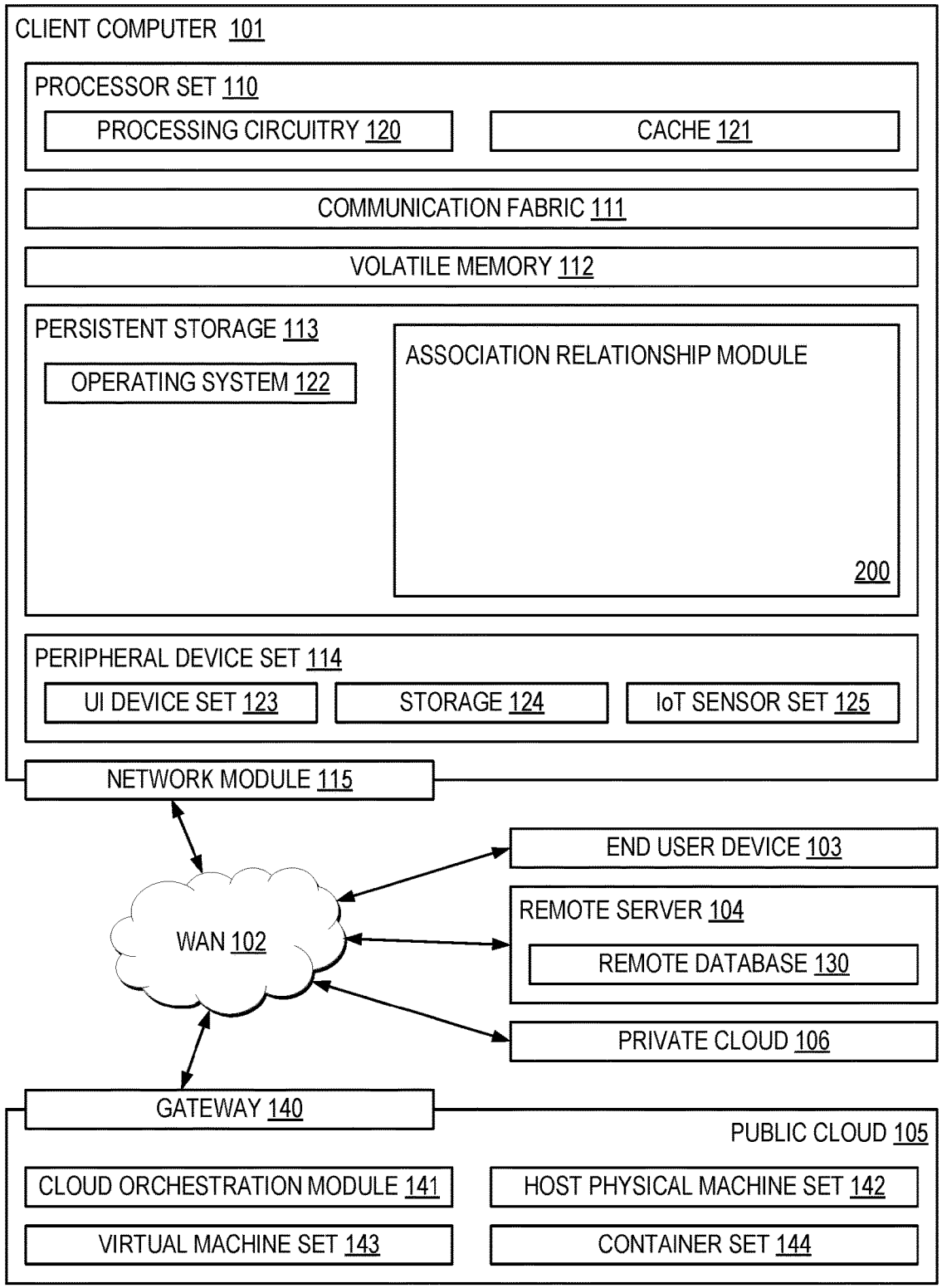
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for building a time dimension based on a time data model and creating an association relationship between the time dimension and a second data model for thereafter analyzing data in the time dimension.

In one general approach, a computer-implemented method includes defining a time data model and building a time dimension based on the time data model. The method further includes defining a second data model. An association relationship is created between the time dimension and the second data model for thereafter analyzing data of the second data model in the time dimension.

In another general approach, a computer program product includes a computer readable storage medium having program instructions embodied therewith. The program instructions are readable and/or executable by a computer to cause the computer to perform the foregoing method.

In another general approach, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as association relationship module of block 200 for building a time dimension based on a time data model and creating an association relationship between the time dimension and a second data model for thereafter analyzing data in the time dimension. In addition to block 200, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
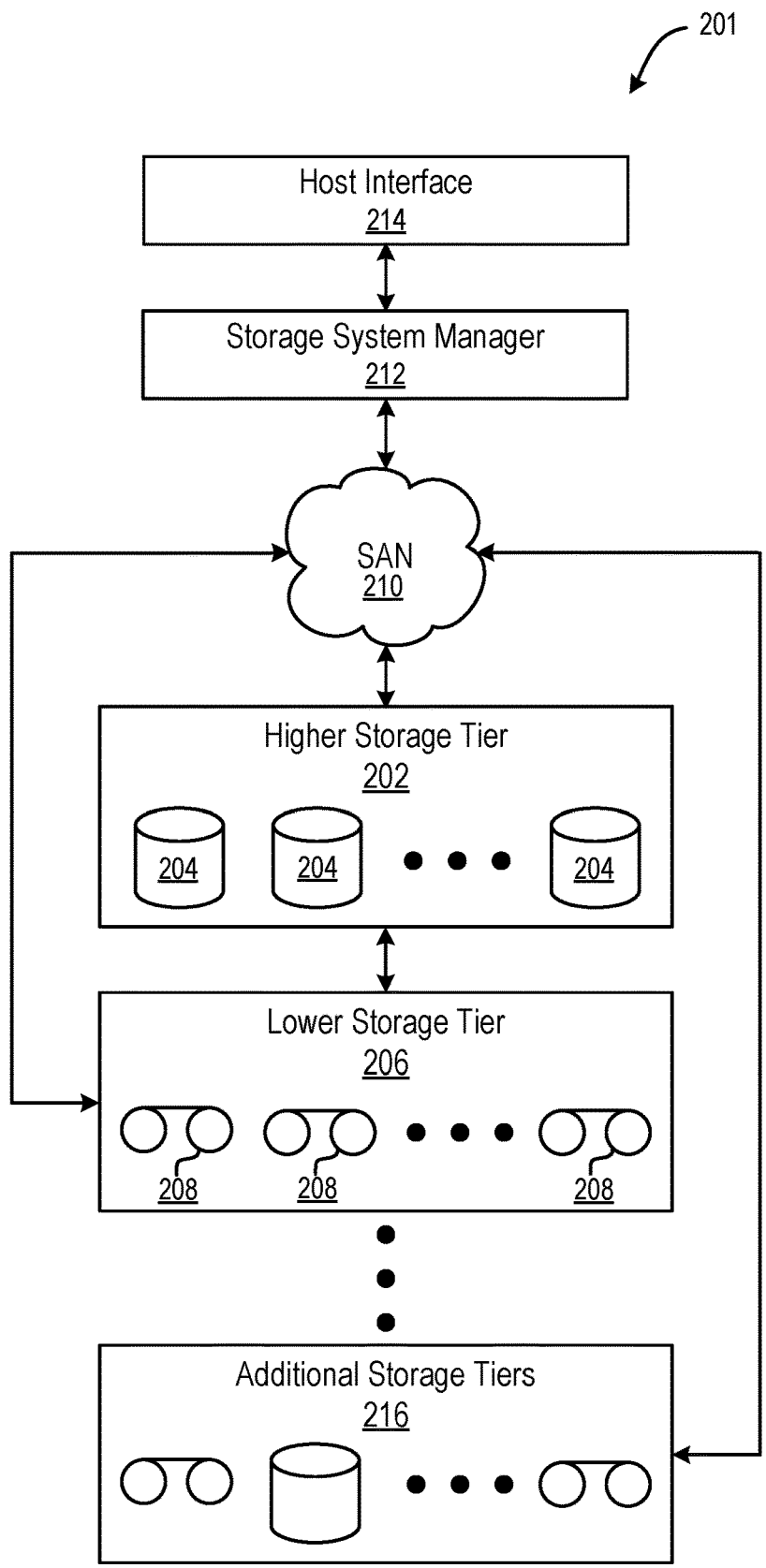
FIG. 2 is a diagram of a tiered data storage system, in accordance with one approach.

Now referring to FIG. 2, a storage system 201 is shown according to one approach. Note that some of the elements shown in FIG. 2 may be implemented as hardware and/or software, according to various approaches. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some approaches, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various approaches.

As mentioned elsewhere above, cyber threats commonly gain unauthorized access to and exploit computer systems of a communication environment, e.g., servers, computers, data storage libraries, etc. These cyber threats may include, e.g., viruses, malware, phishing attacks, web crawlers, etc. Subsequent to gaining unauthorized access to a computer system during a cyber-attack, a cyber threat may exploit the computer system by compromising an integrity of user data accessed during the cyber-attack, causing a failure of the computer system, compromising programs run by the computer system, etc.

Cyber threat analysis is typically performed to determine a cause of and/or to recover from a cyber-attack. Cyber threat analysis is based on information from multiple security tools which protect, scan, monitor and collect information. The information from the different security tools can establish relationships between different entities, e.g., such as entities involved in a cyber-attack in order to determine an extent of the cyber-attack within a computer system.

Time, in most cases, is a generally common property that exists in different information from security tools. This information is used to leverage time to link the event, vulnerabilities, errors etc., to analyze a relationship across different kinds of security related information. In this way, the relationship to different data types is built to analyze and describe a cyber threat. However, currently, in order to analyze data in a time dimension, data is queried via time parameters from different data sources, and the results of the queries are merged. This is a complicated and resource intensive process because data is typically stored in different time formats across these different data sources. For example, a log table may be queried by event time, and a vulnerability may be queried by first seen time. Conventional techniques thereafter are forced to merge the results of these queries of different data sources. Only thereafter are these conventional approaches able to analyze data by time. Furthermore, this analysis is implemented by using relatively complex data warehouse technology to build a multidimensional analysis data cube, the use of which involves an analysis dimension. A performance of correlation analysis using these conventional techniques is relatively very low, because the analysis includes scanning all data through asynchronous batch processing. At the same time, the model is not updatable on demand with a change of a business in order to meet new requirements that result from the changes to the business. Accordingly, there is a need for techniques to comprehensively analyze all kinds of data with respect to time as a unified analysis dimension.

The techniques of various approaches described herein include creating a global time dimension and unified standard data storage system, storing data, e.g., business data in all business systems such as various security tools, into the storage system, and associating all time class attributes to each time node of the timeline of the time dimension, to comprehensively analyze all kinds of business data with time as a unified analysis dimension. Numerous advantages are enabled as a result of utilizing these novel techniques. For example, a unified and relatively simple technical method to analyze all kinds of time-related business data is enabled. Analysis results are also enabled relatively efficiently without having to perform extensive amounts of querying and merging as described elsewhere herein with respect to conventional techniques. Furthermore, these novel techniques are dynamic in that they may be adapted according to business changes without changing a data model of this analysis system solution.

Figure 3A:
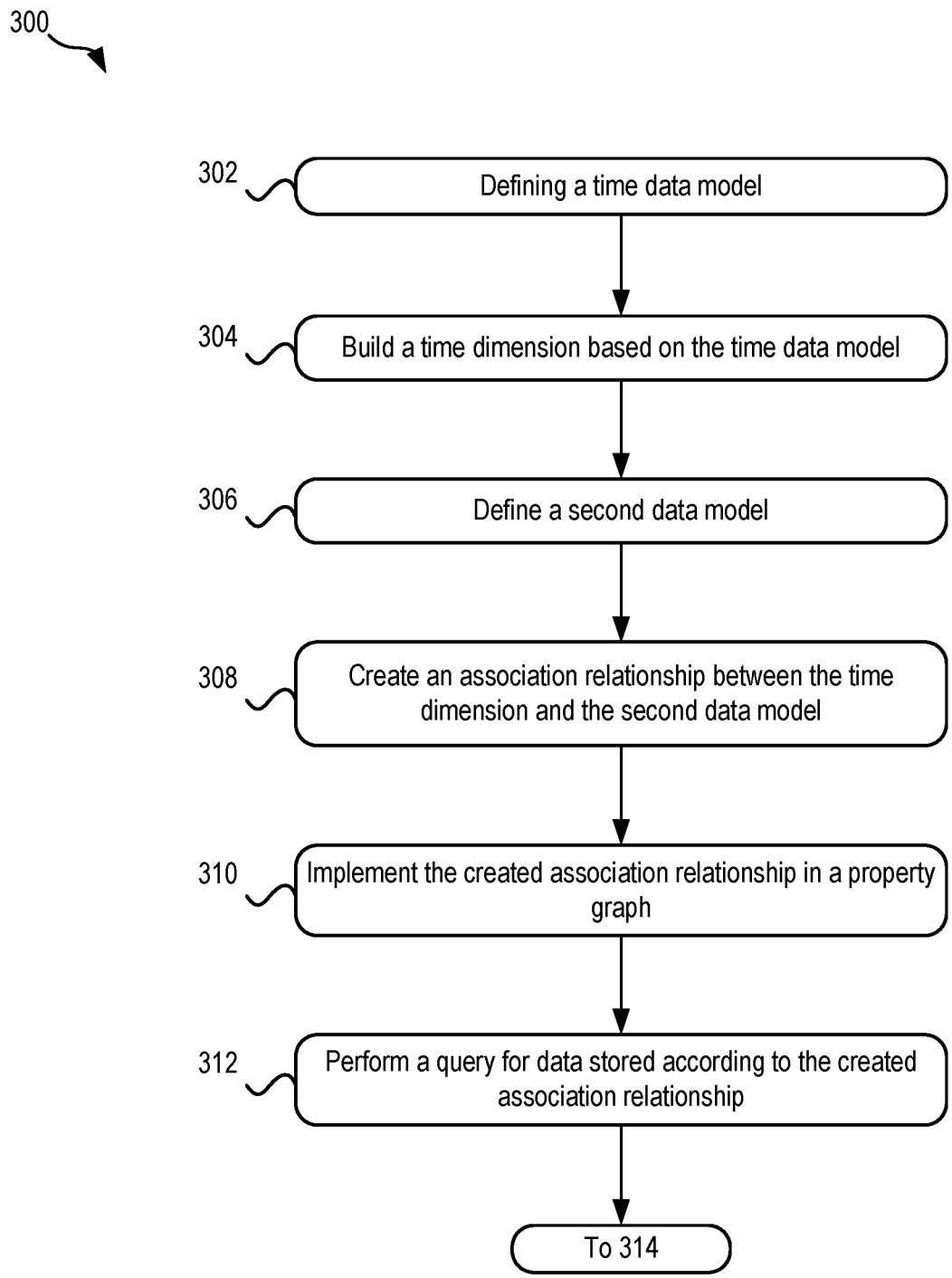
FIG. 3A is a flowchart of a method, in accordance with one approach.
Figure 3A:
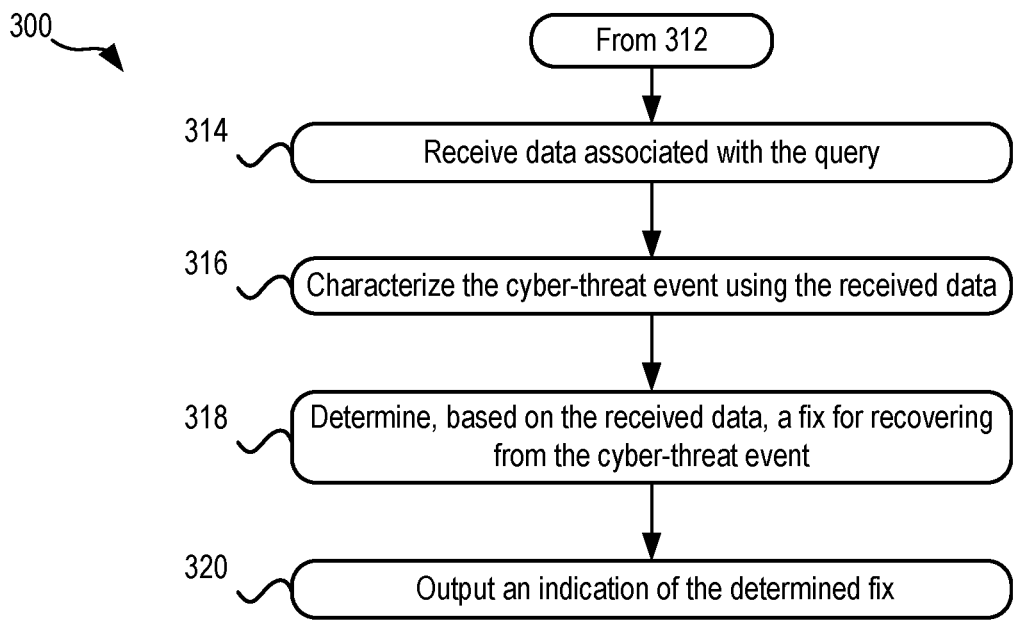

Now referring to FIG. 3, a flowchart of a method 300 is shown according to one approach. The method 300 may be performed in accordance with the present invention in any of the environments depicted in FIGS. 1-9, among others, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a computer, or some other device having one or more processors therein. The processor, e.g., processing circuit(s), chip(s), and/or module(s)

implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 includes defining a time data model. For context, the time data model may include a set of rules and/or attributes that define how a time record is described. For example, according to some preferred approaches, a time attribute may be taken as an independent data model. More specifically, a rule of the time data model may specify that time is to no longer exist as a normal attribute in data tables, e.g., time is not included in business data tables. In some approaches, the rule may additionally and/or alternatively specify that instead of time existing as a normal attribute, time may be standardized as time data, where each instance of time data may be a time record sample that is defined by attributes. In some approaches, the time data of the time data model is defined by one attribute. In some approaches, the time data of the time data model is defined by a plurality of time attributes. In one approach, the time attribute may include a unique identifier of time data, e.g., a unique identifier of a time data node. For example, unique identifiers of time data nodes may include, e.g., time-uuid-0000-0001, time-uuid-0000-0002, time-uuid-0000-0003, time-uuid-0000-0004, etc. In another approach, the time attribute may additionally and/or alternatively include a time type. In one approach, the time type may include a year. In another approach, the time type may include a month. In another approach, the time type may include a day. In yet another approach, the time type may include an hour. In another approach, the time type may include a minute. In yet another approach, the time type may include a second. In some other approaches, the attribute additionally and/or alternatively includes a text format, e.g., to represent a specific time of the time data node. In some preferred approaches, the text format is numbers that indicate one or more different time types. For example, an attribute that is a text format may be "2022" which represents a year time type attribute. In another example, an attribute that is a text format may be "2022:4" which represents year and month time type attributes, e.g., April 2022. In yet another example, an attribute that is a text format may be "2022:4:25" which represents year and month and daytime type attributes, e.g., Apr. 25, 2022. In yet another example, an attribute that is a text format may be "2022:4:25:12" which represents year and month and day and hour time type attributes, e.g., noon on Apr. 25, 2022.

It should be noted that, in some approaches in which the time type is a text format to represent the specific time of time data node, the text format may include a plurality of time types as indicated above, e.g., see 2022:4:25. Furthermore, in one or more of such approaches, the time type may include the relatively highest granularity time type of the plurality of time types, e.g., month has a relatively higher granularity than year, day has a relatively higher granularity than month, hour has a relatively higher granularity than day, etc. For example, assuming that a text format of a time data node specifies "2022:4", the text format may indicate that the time data node was sampled during the month of April in the year 2022. Furthermore, the time type having a relatively highest granularity is the month of April while the year 2022 has a relatively lower granularity, and therefore the time type specified in a time record associated with a time data node is "month." Note that despite only the time type having the relatively highest granularity being specified in a time record, the text format may include information of a plurality of the time types, e.g., "2022:4." In some alternate approaches, a plurality of time types each having a different relative granularity may be specified. For example, assuming that a text format of a time data node specifies "2022:4", the time type specified in a time record associated with a time data node is "year and month."

The time data model may be used to define the specifics, e.g., attributes of a time dimension. It is beneficial to define these specifics in order to establish relativity among different instances in time. Time data of the time data model may be used to build a time dimension. For example, operation 304 includes building a time dimension based on the time data model. For context, this time dimension may be considered a "global" time dimension that all time data is defined within. As will be described in greater detail elsewhere below, this time dimension is useful in that, merging processing that would otherwise be performed in conventional approaches to merge query results defined according to different time references, e.g., not a global time dimension, is not needed using the techniques described in various approaches herein. This improves performance of computer systems that are used to analyze data, e.g., such as the data of query results.

Building the time dimension based on the time data model, in some preferred approaches, includes establishing, e.g., setting up, relationships between time data defined by the time data model. For context, the time data defined by the time data model may be a plurality of time data nodes that each represent a different instance of time within the time data model. In some approaches, the relationships may be based on a next time relationship, e.g., next time along the time dimension, that represents a sequential relationship between time data of a same type. For example, assuming that within a sample of time data nodes, a first time data node includes a text format that includes the year "2021", a second time data node includes a text format that includes the year "2022", and a third time data node includes a text format that includes the year "2023", a first next time relationship preferably defines that the second time data node is next time data to the first time data node, and a second next time relationship preferably defines that the third time data node is next time data to the second time data node. These next time relationships represent the sequential relationship between three time data nodes of the same time type, e.g., year. According to another example, assuming that within a sample of time data nodes, a first time data node includes a text format that includes "2021:4:25" which represents Apr. 25, 2022, a second time data node includes a text format that includes "2021:4:26" which represents Apr. 26, 2022, and a third time data node includes a text format that includes "2021:4:28" which represents Apr. 28, 2022, a first next time relationship preferably defines that the second time data node is next time data to the first time data node, and a second next time relationship preferably defines that the third time data node is next time data to the second time data node. These next time relationships represent the sequential relationship between three time data nodes of the same time type, e.g., year:month:day.

Next time relationships establish a timeline while building the time dimension along which different time data nodes each having different time text formats, e.g., different days, different months, different years, etc., are distinguished from one another, and logically positioned with respect to one another. Accordingly, next time relationships establish detail to the time dimension by creating relationships among time data nodes within the time dimension.

The relationships between time data defined by the time data model may additionally and/or alternatively be based on an include time relationship that represents a logical inclusion relationship between at least first time data, e.g., a first time data node, and second time data, e.g., a second time data node. More specifically, in some approaches, an include time relationship preferably represents a logical inclusion relationship between at least the first time data and the second time data where the second time data is a sub-type, e.g., lower level, of a time type of the first time data. For context, the sub-type may be defined according to relative granularity of text format data of the time data nodes such that time data nodes having text format data with a relatively higher granularity is a sub-type, e.g., lower level, than time data nodes having text format data with a relatively lower granularity. For example, assume that a first time data node includes a text format that includes "January 2022", and a second time data node includes a text format that includes "2022". In this example, the text format "2022" has a relatively lower granularity than the text format "January 2022" because the latter text format includes the month and year as opposed to including only the year. Accordingly, in this example, a logical inclusion relationship, e.g., include, is preferably formed from the second time data node to the first time data node. In another example, assume that a first time data node includes a text format that includes "Jan. 15, 2022", and a second time data node includes a text format that includes "2022". In this example, the text format "2022" has a relatively lower granularity than the text format "Jan. 15, 2022" because the latter text format includes the month, day and year as opposed to including only the year. Accordingly, in this example, a logical inclusion relationship, e.g., include, is preferably formed from the second time data node to the first time data node.

Inclusion relationships establish a sub-types of time data while building the time dimension. This helps to distinguish time data that includes at least some matching data, and logically position the sub-types under time data with a text formal having a relatively lower granularity. Accordingly, next time relationships establish detail to the time dimension by creating relationships among time data nodes.

It should be noted that, in some approaches, data, e.g., such as business data, is preferably not considered during the building of the time dimension based on the time data model. Instead, in such approaches, the time dimension may be built first in order to establish a dimension in which operations and/or data is time driven rather than being event driven.

Method 300, additionally and/or alternatively, includes defining a unified data model, e.g., hereafter referred to as "second data model," on different kinds of data, e.g., hereafter referred to as "second data." For example, operation 306 includes defining a second data model. The data preferably includes business data but may additionally and/or alternatively include any type of data that would become apparent to one of ordinary skill in the art upon reading the descriptions herein. For context, in some approaches, the second data model sets a standard by which all the types of second data are defined. This enables a uniform definition of data. Moreover, method 300 may, in some approaches, include not using data table structures for different data types of second data, and all second data may be stored in the second data model. Within the second data model, the second data preferably is defined by one or more data attributes. In one approach, the data attributes may include a unique identifier of a data node. For example, unique identifiers of data nodes may include, e.g., business-uuid-0000-0001, business-uuid-0000-0002, business-uuid-0000-0003, business-uuid-0000-0004, etc. The data attributes may additionally and/or alternatively include a data type, e.g., which is used to represent a name of a table of data. For example, the data type may include, e.g., "syslog" which indicates a table of second data that is logged and stored in the table according to a predetermined system logging protocol, "vulnerability" which indicates a table of second data associated with a detected vulnerability event that is stored in the table according to a predetermined protocol, etc. In another approach, the data attributes may additionally and/or alternatively include a data attribute field that stores all attribute fields in a second data node. For example, in one approach, a second data node having a syslog data type attribute may include an attribute field that includes event type information. In another approach, a second data node having a syslog data type attribute may include time information that details when a syslog event occurred. In yet another approach, a second data node having a syslog data type attribute may include time information that details source information such as a host of the syslog event. In another approach, a second data node having a syslog data type attribute may include time information that details user information, such as a user that instructed with the syslog event, etc. A second data node having a vulnerability data type attribute may in one approach include an attribute field that includes time information that details when a vulnerability was first detected. In another approach, a second data node having a vulnerability data type attribute may include time information that details when a vulnerability scan was last performed. In another approach, a second data node having a vulnerability data type attribute may include an internet protocol (IP) address associated with the vulnerability event. In yet another approach, a second data node having a vulnerability data type attribute may include common vulnerabilities and exposures (CVE) information associated with the vulnerability event. In another approach, a second data node having a vulnerability data type attribute may include a severity of the vulnerability event.

Defining the uniform definition of data within the second data model is useful in that, merging processing that would otherwise be performed in conventional approaches to merge query results defined according to conventional data table structures, is not needed using the techniques described in various approaches herein. This improves performance of computer systems that are used to analyze data, e.g., such as the data of query results.

An association relationship is created between the time dimension and the second data model, e.g., see operation 308. Creating the association relationship provides a relationship that may be used to analyze all kinds of time-related data. For example, the association relationship may be created and thereafter be used for analyzing, e.g., see implementation and analyzing operations 312-320 elsewhere below, data of the second data model in the time dimension. Various techniques for creating the association relationship are described below.

In some approaches, the association relationship is created between time data nodes of the time dimension and second data nodes of the second data model. In one approach, the association relationship is created based on one time data node of the time dimension and/or one second data node of the second data model. The association relationship may additionally and/or alternatively be created based on a plurality of time data nodes of the time dimension and/or a plurality of second data nodes of the second data model. Furthermore, in some approaches, the association relationship may be defined by at least one association relationship attribute. In some preferred approaches, the association relationship is defined by at least one attribute of a time data node and/or at least one attribute of a second data node. More specifically, in one approach, an association relationship attribute may include a unique identifier of a first of the association relationships, which may be created between a first of the time data nodes of the time dimension and a first of the data nodes of the second data model. Such a unique identifier may include, e.g., relation-uuid-0000-0001, relation-uuid-0000-0002, relation-uuid-0000-0003, relation-uuid-0000-0004, etc. In another approach, an association relationship attribute may additionally and/or alternatively include a unique identifier attribute of the second data node of the second data model, where the second data node is used to create the association relationship. For example, the unique identifier attribute of the first of the data nodes of the second data model may include, e.g., business-uuid-0000-0001. In yet another approach, an association relationship attribute may additionally and/or alternatively include a unique identifier attribute of the first of the time data nodes of the time data model. For example, the unique identifier attribute of the first of the time data nodes of the time data model may include, e.g., time-uuid-0000-0001. An association relationship attribute may additionally and/or alternatively include a type of relationship, e.g., a data attribute that includes a data attribute field. For example, such a type of relationship may include, e.g., syslog, vuln_lastscan, etc. In some preferred approaches, a plurality of these association relationship attributes defines relation data which at least in part defines the association relationship.

Operation 310 includes implementing the created association relationship in a property graph. Looking to FIG. 3B, exemplary sub-operations of implementing a created association relationship in a property graph are illustrated in accordance with one approach, one or more of which may be used to perform operation 310 of FIG. 3A. However, it should be noted that the sub-operations of FIG. 3B are illustrated in accordance with one approach, which is in no way intended to limit the invention.

Implementing the created association relationship in the property graph, in one approach, includes storing time data defined according to the time data model as first vertexes in the property graph, e.g., see sub-operation 352. More specifically, the implementation may include storing each record for time data, e.g., where a record for time data may be the time data, as a vertex in the property graph.

Figure 3B:
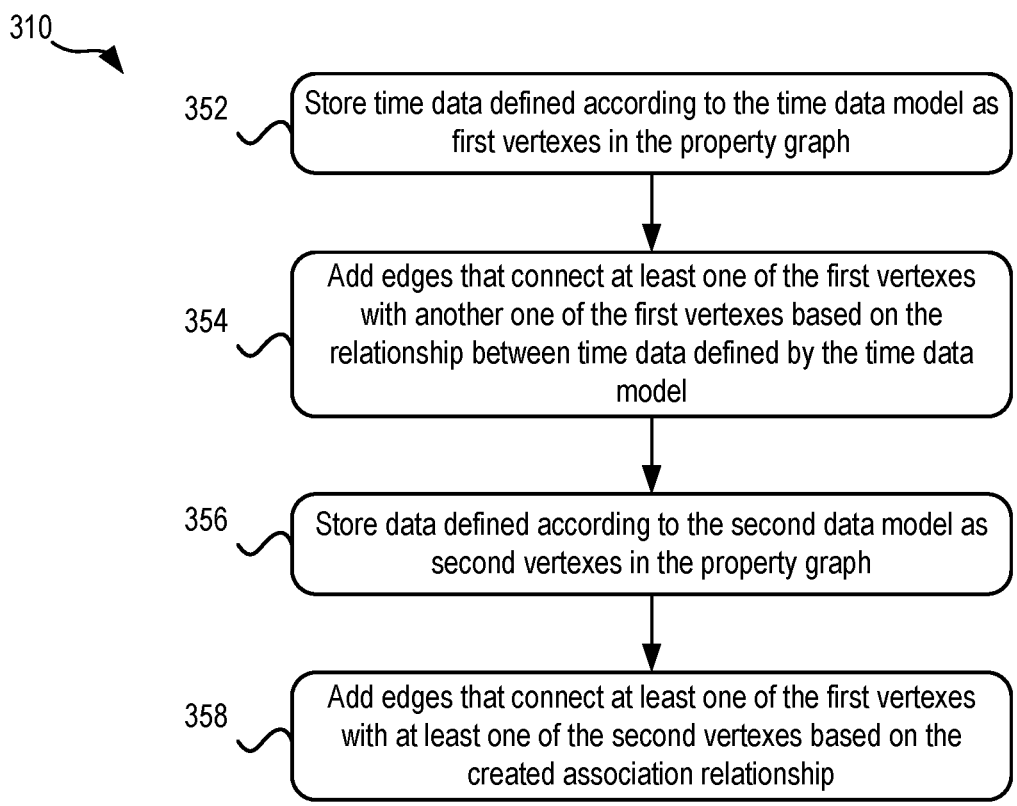
FIG. 3B is a flowchart of sub-operations of an operation of the flowchart of FIG. 3A, in accordance with one approach.

With continued reference to FIG. 3B, implementing the created association relationship in the property graph may in some approaches additionally and/or alternatively include adding edges that connect at least some of the same type of vertexes. For example, sub-operation 354 includes adding edges that connect at least one of the first vertexes with another one of the first vertexes based on the relationship between time data defined by the time data model. For example, assuming that a first vertex is established by storing time data that includes the time type year "2022", and a second vertex is established by storing time data that includes the time type year "2023", the edge that connects the first vertex and the second vertex may be defined by a next time relationship. At this point, in some approaches, the time dimension may be established.

Data defined according to the second data model, e.g., second data, may additionally and/or alternatively be stored as second vertexes in the property graph, e.g., see sub-operation 356. This data may include any type of information, e.g., security scan information, data write information, system snapshot information, computer performance metric information, syslogs information, vulnerability scan information, metadata, cyber-threat event information, etc. This data may be associated with at least some databases and/or computer devices in a network, e.g., an Intrusion Detection System (IDS), a file integrity monitor, an ID and access management system, etc. In some approaches, a predetermined amount of such data may be stored according to the second data model as the second vertexes in response to a determination that a predetermined amount of time has elapsed. In some other approaches, a predetermined amount of such data may be stored according to the second data model as the second vertexes in response to a predetermined event occurring, e.g., a cyber-threat event, a failure event, a cyber-attack event, etc. Vertexes of the property graph may be stored in a predetermined database which may thereafter be accessed and analyzed in the time dimension. More specifically, the implementation may include storing each record for business data, e.g., where a record for business data may be the second data, as a vertex in the property graph. For context, it should be noted that in some approaches, the storing operations described in sub-operations of FIG. 3B may include performing logical store operations, e.g., creating logical pointers between one or more instances of data. In contrast, in some other approaches, the storing operations described in sub-operations of FIG. 3B may additionally and/or alternatively include performing actual store operations, e.g., data writes to a predetermined database to reflect such data and/or relationships among such data.

Sub-process 358 includes adding edges that connect at least one of the first vertexes with at least one of the second vertexes based on the created association relationship. More specifically, assuming that a first vertex includes time data defined according to the time data model, and a second vertex includes second data defined according to the second data model, an edge added to the property graph that connects the first vertex and the second vertex may include at least some association relationship attributes that define an association relationship between the first vertex and the second vertex. This type of edge incorporates association relationship information into the property graph in order to detail a relationship between two vertexes. Accordingly, this type of edge serves as a property edge that may detail properties for a second data type, properties for a time data type, properties for a relationship data type, etc., e.g., see relationship edge that includes the "relation-uuid-0000-0002" UUID attribute in FIG. 8.

Figure 8:
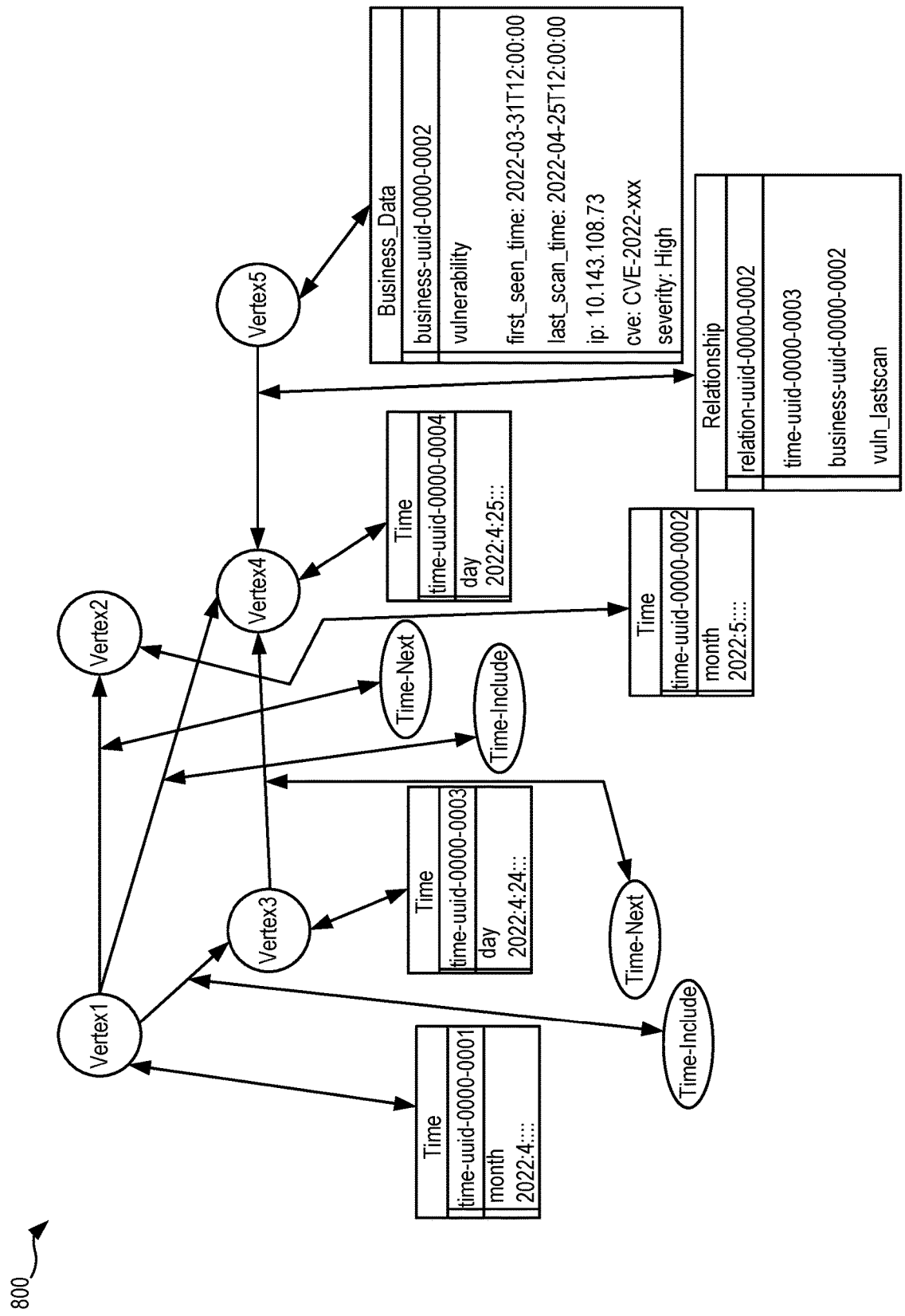
FIG. 8 depicts a property graph, in accordance with one approach.

Implementing the created association relationship in a property graph, e.g., such as the property graph described in sub-operations 352-358 and/or such as the property graph shown in FIG. 8, enables queries to be performed using the property graph. The property graph and relationships therein interconnect vertexes in a way that allows events, e.g., such as cyber-threat events, that occur within a system associated with the association relationship to be analyzed in a temporal sense. Moreover, once a vertex is determined to be associated with such an event, relationships between the vertex and other vertexes may be used to analyze and determine an entire extent of the event.

It should be noted that, although operation 310 and sub-operations thereof specify that the created association relationship may be implemented in a property graph, in some other approaches, the association relationships may additionally and/or alternatively be implemented using techniques that would become apparent to one of ordinary skill in the art upon reading the descriptions herein.

Analyzing data of the second data model in the time dimension may, in some approaches, include performing a query. Operation 312 includes performing a query for data stored according to the created association relationship. In some preferred approaches, the data is queried in the time dimension, e.g., according to an indicated time attribute. More specifically, the query may indicate a time attribute that at least partially defines the time dimension. For example, a query may be performed according to a specified time and include an input query date parameter. In such an example, the query may be performed on a time vertex having the input time dimension specifications. According to another example, a query may be performed according to a specified before time and include an input begin date parameter. In another approach, a query may be performed according to a specified after time and include an input end date parameter. In yet another approach, a query of may be performed according to a specified between time and include a begin date parameter and an end date parameter. In such examples, each of the queries may be performed on a time vertex having the input time dimension specifications.

In some approaches, one or more of the queries mentioned above may be issued in response to a determination that a predetermined event has occurred. For example, a query may be issued in response to detection of a known type of cyber-threat event. In another approach, a query may be issued in response to a determination that the performance of a computer device, that is performing method 300, has fallen below a predetermined threshold. In yet another approach, a query may be issued periodically, e.g., in response to a determination that a predetermined amount of time has elapsed.

Data associated with the query may be received, e.g., see operation 314. The received data is preferably defined according to the second data model and is associated with the time attribute indicated in the query. The received data may include data of vertexes of the property graph that satisfy the query requirements. The received data may additionally and/or alternatively include data of edges and/or vertexes determined to include at least a predetermined degree of similarity with one or more vertexes that satisfy the query requirements. For example, a predetermined degree of neighboring vertexes and/or edges to a vertex that satisfies the query requirements may be included in the received data.

A cyber-threat event may be characterized using the received data, e.g., see operation 316. Characterization of the cyber-threat event may include aggregating time data and/or second data of the received data to thereafter use in comparisons with other time data and/or second data of a system to determine whether the system is relatively close to experiencing a similar cyber-threat event. In another approach, the characterization of the cyber-threat event may include aggregating time data and/or second data of the received data to thereafter incorporate into a machine learning algorithm that is configured to identify a predetermined type of event, e.g., such as a cyber-event, based on being provided and processing such received data. Characterization of a cyber-threat event is important and useful for preventing such events from occurring, which as a result improves the functionality and sustains processing capabilities in systems performing method 300 that are subject to similar cyber-threat events.

Method 300 includes determining, based on the received data, a fix for recovering from the cyber-threat event, e.g., see operation 318. In some approaches, the fix may be determined from a table that includes a plurality of fixes that are each pre-associated with a different potential query result. In another approach, determining the fix for recovering from the cyber-threat event may include outputting an indication of the received data to a predetermined third party device, e.g., an administrator device used by an administrator, and thereafter receiving, from the third party device, an indication of the fix. For context, it may be noted that the "indication" may include, e.g., a sample, actual data, logical pointers, etc., depending on the approach.

Operation 320 includes outputting an indication of the determined fix. The indication of the determined fix is in some approaches output to a device that is configured to apply the determined fix to a system that was compromised by the cyber-threat event. Method 300 may optionally include applying the determined fix. In some approaches, applying the determined fix may include instructing that the determined fix be implemented. In another approach, applying the determined fix may include compiling and executing segment(s) of code that are configured to cause the fix to occur and/or prevent one or more types of cyber-threat events from thereafter occurring in one or more systems. As a result, performance of computer devices is improved, as the performance is not compromised by cyber-threat events that would likely occur without using the techniques described herein.

Numerous benefits are enabled as a result of implementing the techniques described herein. For example, creating an association relationship between time data nodes of the global time dimension and business second data nodes of the second data model, a unified and simple technical technique for analyzing all kinds of time-related data, e.g., time-related business data, is established. Furthermore, an independent dimension based on time axis is established. Security events may be analyzed based on this time dimension. For example, based on a specified time sequence, security events may be grouped at any time granularity. Analyzed results are also obtained relatively efficiently as a substantial amount of processing that is performed in merging operations of conventional analysis techniques is eliminated using the techniques described herein. The techniques described herein furthermore enable analysis implementation to be quickly adaptable to business changes, e.g., changes in relevant time zones, increases to data storage volume size, etc., without changing the data model of this analysis system solution. This is because the time dimension is established using the techniques described herein, e.g., see operation 304, and remains unaffected by these changes. Accordingly, these techniques are easily extended or changed to provide a flexible way to handle all kinds of security events. Furthermore, it should be noted that, building a time dimension based on a time data model and creating an association relationship between the time dimension and a second data model for thereafter analyzing data in the time dimension has heretofore not been considered in conventional systems. In sharp contrast to the conventional techniques described elsewhere above, the novel approaches described herein build relationships between different kinds of business data and a continuous timeline, which as a result allows for a time-driven event flow. Accordingly, the inventive discoveries disclosed herein with regards to use of a built time dimension and created association relationship between the time dimension and a second data model proceed contrary to conventional wisdom.

Figure 4:
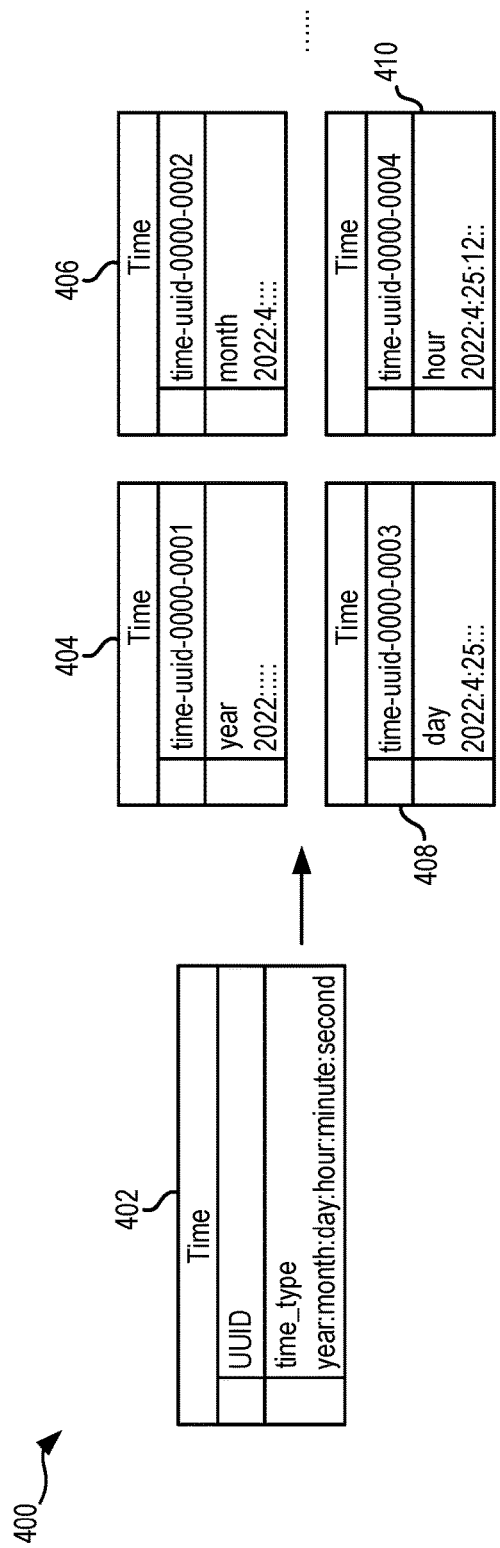
FIG. 4 depicts a representation of defining a global and independent time data model, in accordance with one approach.

FIG. 4 depicts a representation 400 of defining a global and independent time data model, in accordance with one approach. As an option, the present representation 400 may be implemented in conjunction with features from any other approach listed herein, such as those described with reference to the other FIGS. Of course, however, such representation 400 and others presented herein may be used in various applications and/or in permutations which may or may not be specifically described in the illustrative approaches listed herein. Further, the representation 400 presented herein may be used in any desired environment.

Building a time data model, in some approaches, includes defining a plurality of time attributes to use. For example, the time data model 402 includes a plurality of attributes. A first of such attributes includes a unique identifier of time data such as a time data node, e.g., see UUID. Another of such attributes includes a time type, e.g., see time_type. Yet another of such attributes includes a text format, e.g., see year:month:day:hour:minute:second, which serves as a text format to represent the specific time of the time node.

Representation 400 also includes a plurality of time data records sampled across different time types. The time records include the attributes of the time data model 402. For example, a first time data record 404 includes a unique identifier attribute "time-uuid-0000-0001", a time type attribute "year", and a text format attribute "2022:::::". A second time data record 406 includes a unique identifier attribute "time-uuid-0000-0002", a time type attribute "month", and a text format attribute "2022:4::::". A third time data record 408 includes a unique identifier attribute "time-uuid-0000-0003", a time type attribute "day", and a text format attribute "2022:4:25:::". A fourth time data record 410 includes a unique identifier attribute "time-uuid-0000-0004", a time type attribute "hour", and a text format attribute "2022:4:25:12::". Note that representation may include more than four time data records, e.g., see " . . . ".

Figure 5:
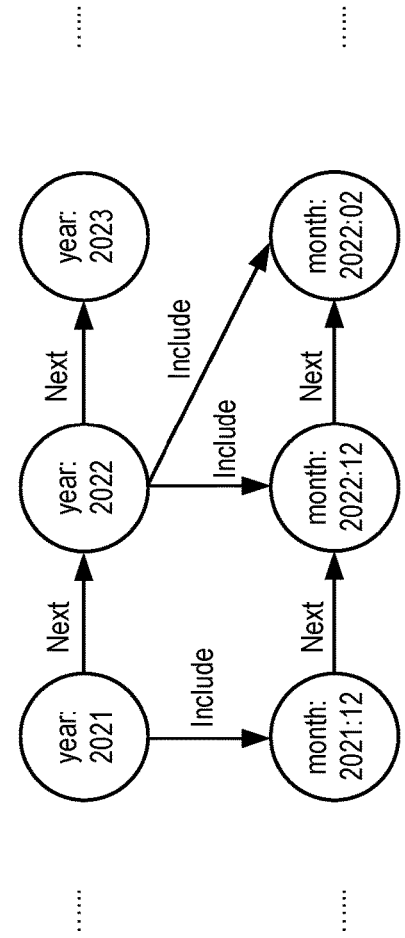
FIG. 5 depicts a representation of a time dimension built based on a defined time data model, in accordance with one approach.

FIG. 5 depicts a representation of a time dimension 500 built based on a defined time data model, in accordance with one approach. As an option, the present representation of the time dimension 500 may be implemented in conjunction with features from any other approach listed herein, such as those described with reference to the other FIGS. Of course, however, such representation of the time dimension 500 and others presented herein may be used in various applications and/or in permutations which may or may not be specifically described in the illustrative approaches listed herein. Further, the representation of the time dimension 500 presented herein may be used in any desired environment.

A time dimension may, in some approaches, be built based on a time data model. For example, in some approaches, the representation of a time dimension 500 may be based on the time data model described elsewhere herein, e.g., see FIG. 4.

A relationship between time data is setup in FIG. 5 to build a time dimension. The representation of the time dimension 500 includes next time relationships, e.g., see "Next", that represent the sequential relationship between time nodes of the same time type. The representation of the time dimension 500 also includes include time relationships, e.g., see "Include", that represent the logical inclusion relationship between a time data node and a time node in a lower level time type. For example, the time data node of 2022 includes the time data node of 2022:01 which represents January 2022. In some approaches, a time type that includes year and month may be used to represent the next and include relationships between time data.

Figure 6:
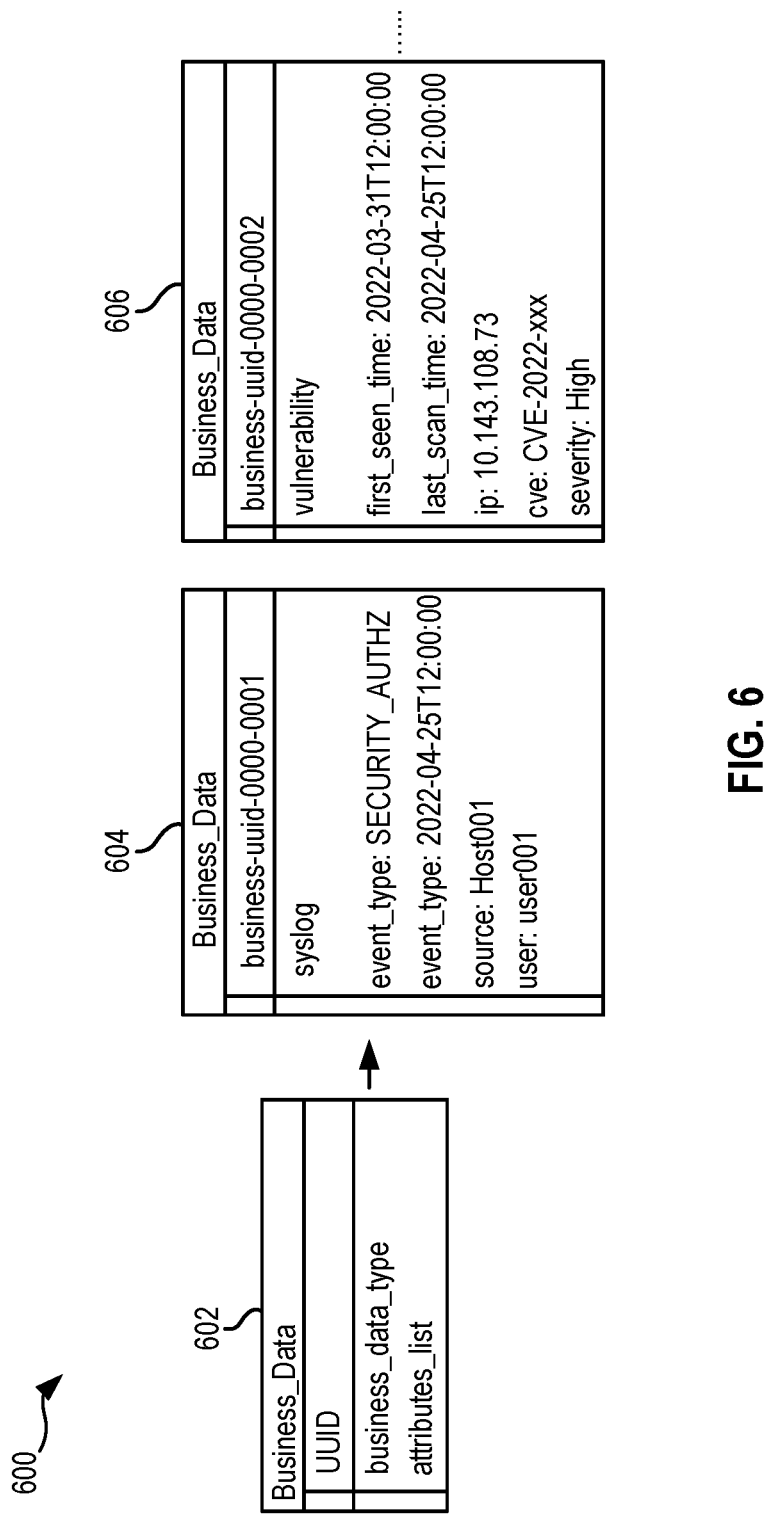
FIG. 6 depicts a representation of creating a second data model, in accordance with one approach.

FIG. 6 depicts a representation 600 of creating a second data model, in accordance with one approach. As an option, the present representation 600 may be implemented in conjunction with features from any other approach listed herein, such as those described with reference to the other FIGS. Of course, however, such representation 600 and others presented herein may be used in various applications and/or in permutations which may or may not be specifically described in the illustrative approaches listed herein. Further, the representation 600 presented herein may be used in any desired environment.

In some approaches, building the second data model includes not using data table structures for different business data types, and storing all second data, e.g., business data, in a unified data model. Different types of second data are preferably stored as unified second data. Each sample of second data may be defined by at least one attribute. For example, the data model 602 for second data includes a first attribute that is a unique identifier of data node, e.g., see UUID. A second of such attributes may include a data type, e.g., see business_data_type, which may be used to represent a table name. Yet another one of such approaches includes storing all business attribute fields in a data node, e.g., see attribute_list. According to some more specific examples, FIG. 6 includes a plurality of data records sampled across different types of record. A first of the data records 604 includes attributes defined according to the attributes of the data model 602. For example, the first data record 604 includes a unique identifier of data node, e.g., see business-uuid-0000-0001; a data type, e.g., see syslog; and an attribute field, e.g., see event_type: SECURITY_AUTHZ, event_type: 2022-04-25T12:00:00, source: Host001, and user: user001.

A second of the data records 606 includes attributes defined according to the attributes of the data model 602. For example, the first data record 606 includes a unique identifier of data node, e.g., see business-uuid-0000-0002; a data type, e.g., see vulnerability; and an attribute field, e.g., see first_seen_time: 2022-03-3IT12:00:00, last_scan_time: 2022-04-25T12:00:00, ip: 10.143.108.73, cve: CVE-2022-xxx, and severity: High.

Figure 7:
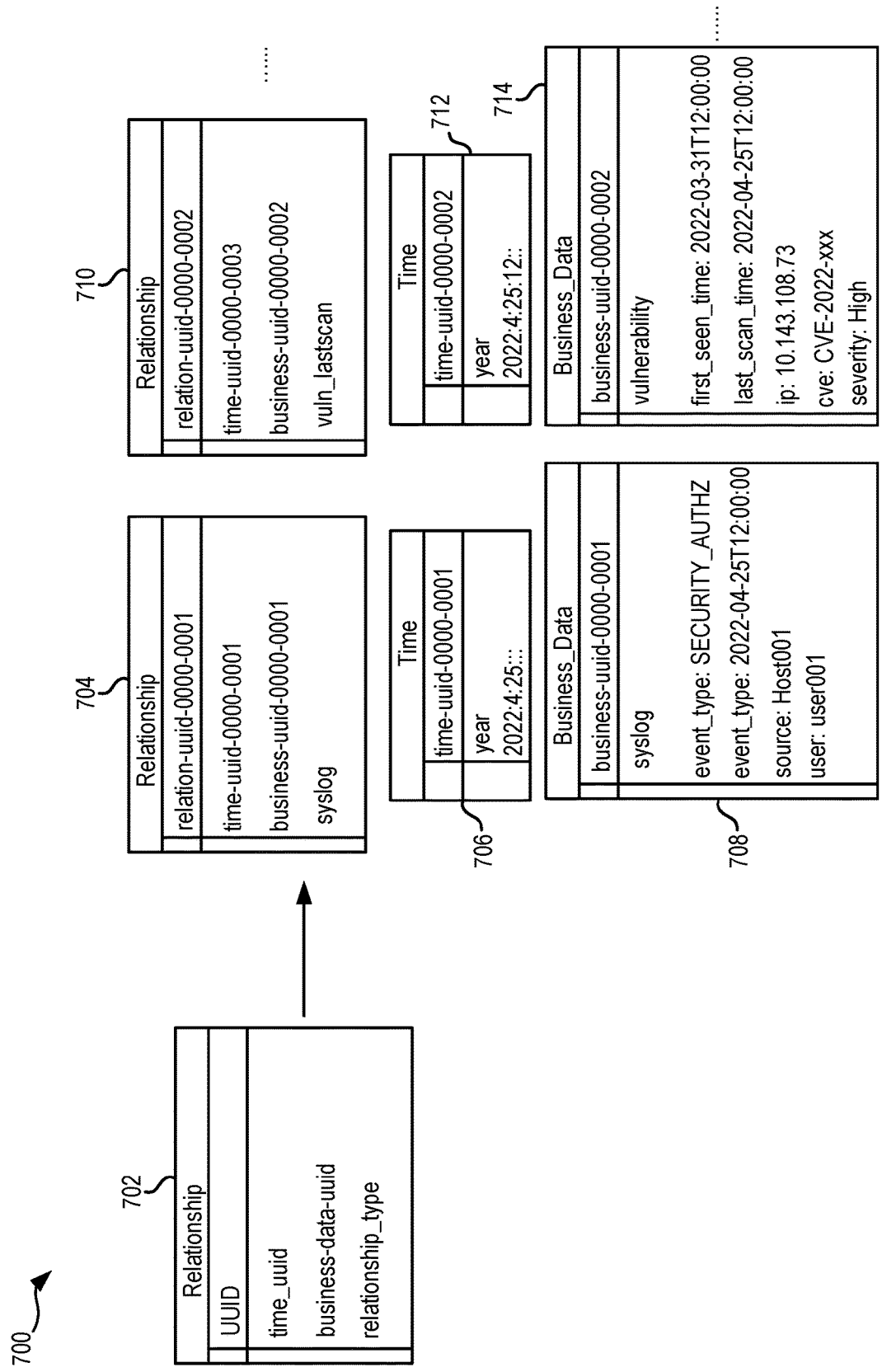
FIG. 7 depicts a representation of creating an association relationship between a time dimension and a second data model, in accordance with one approach.

FIG. 7 depicts a representation 700 of creating an association relationship between a time dimension and a second data model, in accordance with one approach. As an option, the present representation 700 may be implemented in conjunction with features from any other approach listed herein, such as those described with reference to the other FIGS. Of course, however, such representation 700 and others presented herein may be used in various applications and/or in permutations which may or may not be specifically described in the illustrative approaches listed herein. Further, the representation 700 presented herein may be used in any desired environment.

An association relationship may, in some approaches, be created between time data nodes of a global time dimension and business second data nodes of a second data model. The association relationship may be defined by a plurality of association relationship attributes. For example, a data model 702 for time and business data relations includes a unique identifier of an association relationship, e.g., a UUID, a unique identifier of business data, e.g., see business-data-uuid, a unique identifier of time data, e.g., see time_uuid, and a type of the relationship, e.g., see relationship_type.

The representation 700 includes a plurality of data record samples for relationships between data types and time data types. For example, a first data record 704 sample illustrates an association relationship that is based on time data 706 and second data, e.g., business data 708. The first data record 704 includes a plurality of the attributes of the data model 702, that are based on the time data 706 and the business data 708. For example, the first data record 704 includes a unique identifier of an association relationship, e.g., see relation-uuid-0000-0001, a unique identifier of business data, e.g., see business-uuid-0000-0001, a unique identifier of time data, e.g., see time-uuid-0000-0001, and a type of the relationship, e.g., see syslog. The second data record 710 includes a plurality of the attributes of the data model 702, that are based on the time data 712 and the business data 714. For example, the first data record 710 includes a unique identifier of an association relationship, e.g., see relation-uuid-0000-0002, a unique identifier of business data, e.g., see business-uuid-0000-0002, a unique identifier of time data, e.g., see time-uuid-0000-0003, and a type of the relationship, e.g., see vuln_lastscan.

FIG. 8 depicts a property graph 800 implementing a created association relationship, in accordance with one approach. As an option, the present property graph 800 may be implemented in conjunction with features from any other approach listed herein, such as those described with reference to the other FIGS. Of course, however, such property graph 800 and others presented herein may be used in various applications and/or in permutations which may or may not be specifically described in the illustrative approaches listed herein. Further, the property graph 800 presented herein may be used in any desired environment.

The property graph is made up with vertexes, edges, and properties. In one approach, at least some of the vertexes include a business data type, e.g., each record for business data stored may be stored as a vertex. For example, vertex5 is shown to be based on the business data having a unique identifier "business-uuid-0000-0002". At least some of the vertexes may include a time data type, e.g., each record for time data may be stored as a vertex. For example, vertex1 is shown to be based on time data having a unique identifier "time-uuid-0000-0001", vertex2 is shown to be based on time data having a unique identifier "time-uuid-0000-0002", vertex3 is shown to be based on time data having a unique identifier "time-uuid-0000-0003", and vertex4 is shown to be based on time data having a unique identifier "time-uuid-0000-0004".

In some approaches, the edges of the property graph 800 may be based on a relationship data model between business data and time data, e.g., edges may be created between business data and time data to represent the relationship. For example, the relationship having the unique identifier "relation-uuid-0000-0002" is an edge that establishes a relationship between vertex4 and vertex5. The edges of the property graph 800 may additionally and/or alternatively be based on next and/or include relationships between time data for a time dimension, e.g., edges may be added between different time data to setup relationship for next time and include time to build the time dimension. For example, the edge between vertex1 and vertex2 is a "time-next" relationship and the edge between vertex3 and vertex4 is a "time-next" relationship. Furthermore, the edge between vertex1 and vertex4 is a "time-include" relationship and the edge between vertex1 and vertex3 is a "time-include" relationship.

Properties may also be added in the property graph for business data type, time data type, and/or relationship data type. For example, these properties are the lower most attributes listed in the lowermost sub-boxes of the boxes in FIG. 8. For example, the properties of the time data having the unique identifier time-uuid-0000-0001, includes "month", and "2022:4::::". The properties of the relationship data having the unique identifier relation-uuid-0000-0002, includes "time-uuid-0000-0003", "business-uuid-0000-0002" and "vuln_lastscan". The properties of the business data having the unique identifier business-uuid-0000-0002, includes "first_seen_time: 2022-03-31T12:00:00", "last_scan_time: 2022-04-25T12:00:00", "ip: 10.143.108.73", "cve: CVE-2022-xxx" and "severity: High".

Figure 9:
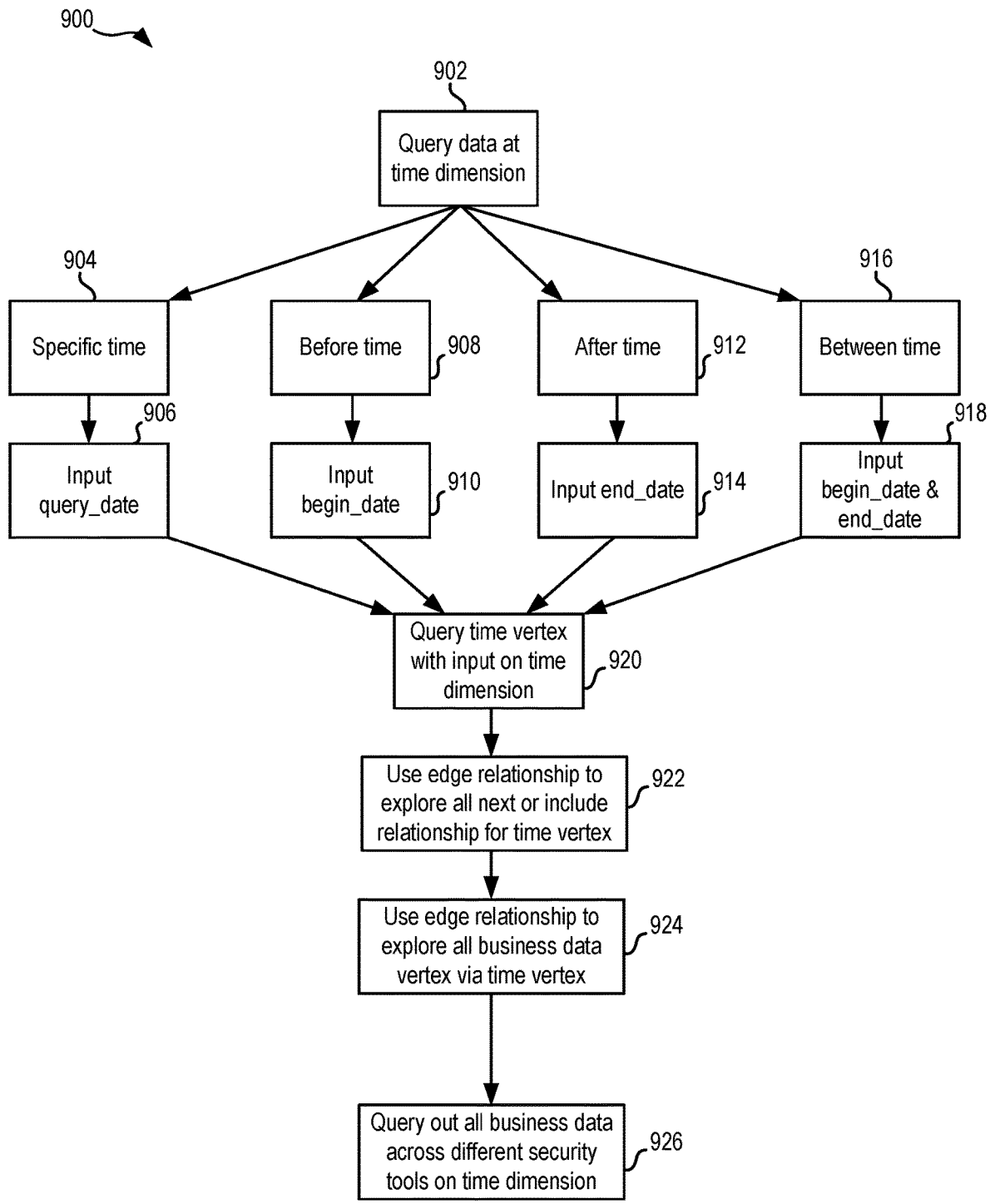
FIG. 9 is a flowchart of a method, in accordance with one approach.

Now referring to FIG. 9, a flowchart of a method 900 is shown according to one approach. The method 900 may be performed in accordance with the present invention in any of the environments depicted in FIGS. 1-9, among others, in various approaches. Of course, more or fewer operations than those specifically described in FIG. 9 may be included in method 900, as would be understood by one of skill in the art upon reading the present descriptions.

Each of the steps of the method 900 may be performed by any suitable component of the operating environment. For example, in various approaches, the method 900 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

Method 900 includes operations analyzing data within the context of a created association relationship between a time dimension and a second data model. Analyzing data of the second data model in the time dimension may in some approaches include performing a query. Operation 902 includes performing a query for data stored according to the created association relationship. In some preferred approaches, the data is queried in the time dimension. More specifically, the query may indicate a time attribute that at least partially defines the time dimension. For example, a query may be performed according to a specified time and include an input query date parameter. In such an example, the query may be performed on a time vertex having the input time dimension specifications, e.g., see operations 904-906. According to another example, a query may be performed according to a specified before time and include an input begin date parameter, e.g., see operations 908-910. In another approach, a query may be performed according to a specified after time and include an input end date parameter, e.g., see operations 912-914. In yet another approach, a query may be performed according to a specified between time and include a begin date parameter and an end date parameter, e.g., see operations 916-918. In such examples, each of the queries may be performed on a time vertex having the input time dimension specifications.

One or more queries are performed on one or more time vertexes according to the input time dimension(s), e.g., see operation 920. Data associated with the query may be received. The received data is preferably defined according to the second data model and is associated with the time attribute indicated in the query. The received data may include data of vertexes of the property graph that satisfy the query requirements. The received data may additionally and/or alternatively include data of edges and/or vertexes determined to include at least a predetermined degree of similarity with one or more vertexes that satisfy the query requirements, e.g., see operation 922. For example, a predetermined degree of neighboring vertexes and/or edges to a vertex that satisfy the query requirements may be included in the received data, e.g., see operation 924. Method 900 also includes querying out all business data across different security tools based on the time dimension, e.g., see operation 926. These security tools may include, e.g., known type of security scanning tools. Results of these queries may, in some approaches, be analyzed to characterize an event that has occurred, e.g., a cyber-threat event, with respect to a specified time around the event.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
   building a time dimension based on a defined time data model,
   wherein event driven data is not considered during the building of the time dimension based on the time data model;
   defining a second data model;
   creating an association relationship between the time dimension and the second data model;
   in response to detection of a first cyber-threat event, issuing a query for data stored according to the created association relationship;
   characterizing the first cyber-threat event using received data associated with the query, wherein the received data is defined according to the second data model; and
   initiating a fix, determined based on the received data, for recovering from the first cyber-threat event.

2. The computer-implemented method of claim 1, wherein the time data model is defined by a plurality of time attributes, wherein the time attributes include a unique identifier of time data, a time type, and a text format.

3. The computer-implemented method of claim 1, wherein building the time dimension includes establishing a relationship between time data defined by the time data model, wherein the relationship is based on a next time relationship that represents a sequential relationship between time data of a same type, wherein the event driven data includes business data.

4. The computer-implemented method of claim 3, wherein the relationship is based on an include time relationship that represents a logical inclusion relationship between first time data and second time data, wherein the second time data is a sub-type of a time type of the first time data such that the time type of the second time data has a relatively higher granularity than the time type of the first time data.

5. The computer-implemented method of claim 1, wherein the second data model is defined by a plurality of data attributes, wherein the data attributes include a unique identifier of a data node, a data type, and a data attribute field.

6. The computer-implemented method of claim 1, wherein the association relationship is created between time data nodes of the time dimension and second data nodes of the second data model, wherein the association relationship is defined by a plurality of association relationship attributes.

7. The computer-implemented method of claim 6, wherein the association relationship attributes are selected from the group consisting of: a unique identifier of a first of the association relationships that is created between a first of the time data nodes of the time dimension and a first of the second data nodes of the second data model, a unique identifier attribute of the first of the second data nodes, a unique identifier attribute of the first of the time data nodes, and a type of relationship.

8. The computer-implemented method of claim 1, comprising: implementing the created association relationship in a property graph, wherein implementing the created association relationship in the property graph includes: storing time data defined according to the time data model as first vertexes in the property graph, storing data defined according to the second data model as second vertexes in the property graph.

9. The computer-implemented method of claim 8, wherein implementing the created association relationship in the property graph includes: adding edges that connect at least one of the first vertexes with at least one of the second vertexes based on the created association relationship.

10. The computer-implemented method of claim 8, wherein building the time dimension includes establishing a relationship between time data defined by the time data model, wherein implementing the created association relationship in the property graph includes: adding edges that connect at least one of the first vertexes with another one of the first vertexes based on the relationship between time data defined by the time data model.

11. The computer-implemented method of claim 1, wherein the query indicates a time attribute that at least partially defines the time dimension, wherein the received data is associated with the indicated time attribute.

12. The computer-implemented method of claim 11, comprising: defining the time data model; incorporating the characterization of the first cyber-threat event to a machine learning algorithm to use for detecting a second cyber-threat event, wherein the first cyber-threat event is detected by the machine learning algorithm; and outputting an indication of the determined fix.

13. A computer program product, the computer program product comprising a computer readable storage medium having program instructions embodied therewith, the program instructions readable and/or executable by a computer to cause the computer to:
   build, by the computer, a time dimension based on a time data model,
   wherein event driven data is not considered during the building of the time dimension based on the time data model;
   define, by the computer, a second data model;
   create, by the computer, an association relationship between the time dimension and the second data model;
   in response to detection of a first cyber-threat event, issue, by the computer, a query for data stored according to the created association relationship;

characterize, by the computer, the first cyber-threat event using received data associated with the query, wherein the received data is defined according to the second data model; and initiate, by the computer, a fix, determined based on the received data, for recovering from the first cyber-threat event.

14. The computer program product of claim 13, wherein the time data model is defined by a plurality of time attributes, wherein the time attributes include a unique identifier of time data, a time type, and a text format.

15. The computer program product of claim 13, wherein building the time dimension includes establishing a relationship between time data defined by the time data model, wherein the relationship is based on a next time relationship that represents a sequential relationship between time data of a same type, wherein the event driven data includes business data.

16. The computer program product of claim 15, wherein the relationship is based on an include time relationship that represents a logical inclusion relationship between first time data and second time data, wherein the second time data is a sub-type of a time type of the first time data such that the time type of the second time data has a relatively higher granularity than the time type of the first time data.

17. The computer program product of claim 13, wherein the second data model is defined by a plurality of data attributes, wherein the data attributes include a unique identifier of a data node, a data type, and a data attribute field.

18. The computer program product of claim 13, wherein the association relationship is created between time data nodes of the time dimension and second data nodes of the second data model, wherein the association relationship is defined by a plurality of association relationship attributes.

19. The computer program product of claim 13, the program instructions readable and/or executable by the computer to cause the computer to: implement, by the computer, the created association relationship in a property graph, wherein implementing the created association relationship in the property graph includes: storing time data defined according to the time data model as first vertexes in the property graph, storing data defined according to the second data model as second vertexes in the property graph.

20. The computer program product of claim 19, wherein implementing the created association relationship in the property graph includes: adding edges that connect at least one of the first vertexes with at least one of the second vertexes based on the created association relationship.

21. The computer program product of claim 19, wherein building the time dimension includes: establishing a relationship between time data defined by the time data model, wherein implementing the created association relationship in the property graph includes: adding edges that connect at least one of the first vertexes with another one of the first vertexes based on the relationship between time data defined by the time data model.

22. The computer program product of claim 13, wherein the query indicates a time attribute that at least partially defines the time dimension, wherein the received data is associated with the indicated time attribute.

23. The computer program product of claim 22, the program instructions readable and/or executable by the computer to cause the computer to: define, by the computer, the time data model; incorporate, by the computer, the characterization of the first cyber-threat event to a machine learning algorithm to use for detecting a second cyber-threat event, wherein the first cyber-threat event is detected by the machine learning algorithm; and output, by the computer, an indication of the determined fix.

24. A system, comprising:
a processor; and
logic integrated with the processor, executable by the processor, or integrated with and executable by the processor, the logic being configured to:
build a time dimension based on a time data model, wherein event driven data is not considered during the building of the time dimension based on the time data model;
define a second data model;
create an association relationship between the time dimension and the second data model;
in response to detection of a first cyber-threat event, issue a query for data stored according to the created association relationship;
characterize the first cyber-threat event using received data associated with the query, wherein the received data is defined according to the second data model; and
initiate a fix, determined based on the received data, for recovering from the first cyber-threat event.

25. The system of claim 24, wherein the time data model is defined by a plurality of time attributes, wherein the time attributes include a unique identifier of time data, a time type, and a text format.

* * * * *